J. W. LANE.
THREAD CUTTING TOOL.
APPLICATION FILED FEB. 24, 1917.
1,270,958.
Patented July 2, 1918.
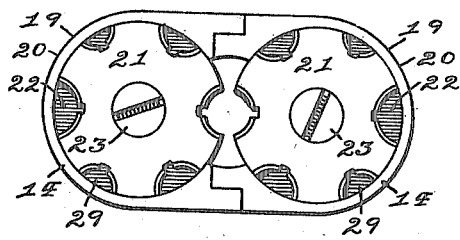
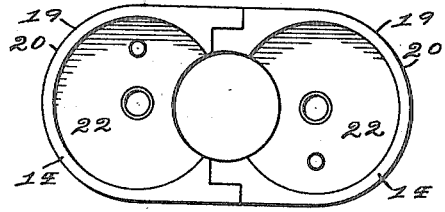
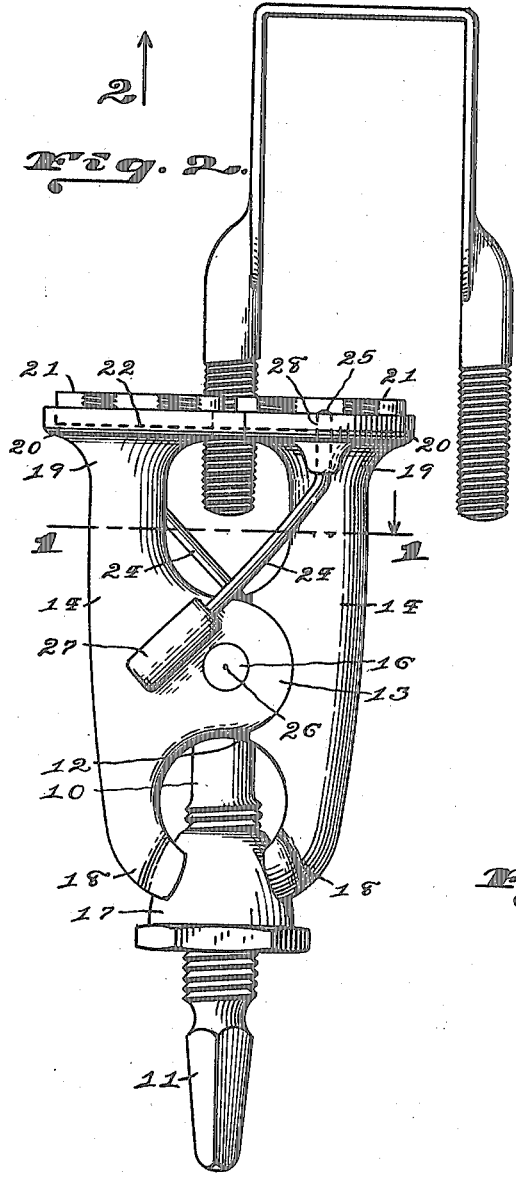
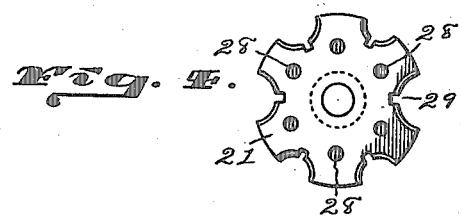
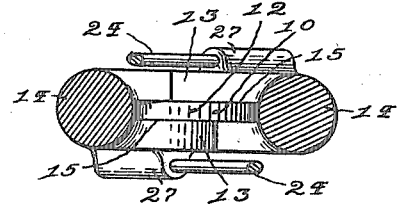
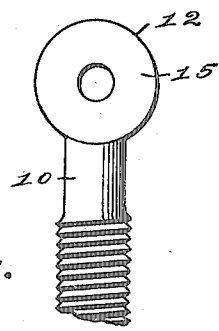
INVENTOR:
John W. Lane.
BY
Frank P. Shepard.
ATTORNEY.

UNITED STATES PATENT OFFICE.

JOHN W. LANE, OF LOS ANGELES, CALIFORNIA.

THREAD-CUTTING TOOL.

1,270,958.  Specification of Letters Patent.  Patented July 2, 1918.

Application filed February 24, 1917. Serial No. 150,800.

*To all whom it may concern:*

Be it known that I, JOHN W. LANE, a citizen of the United States, residing at Los Angeles, in the county of Los Angeles and State of California, have invented certain new and useful Improvements in Thread-Cutting Tools, of which the following is a specification, reference being had to the accompanying drawings.

The invention pertains to thread-cutting tools in which the separable members of the die are carried by movable jaws, and in which the die members are arranged to be shifted or revolved to different positions on the jaws.

The invention provides improved means for locking the die members in alinement on the jaws, and this means is arranged to lock the die members upon a closing movement of the jaws and release said die members upon an opening movement of the jaws.

Other advantages of the invention will be set forth in the ensuing description.

One embodiment of the invention is shown by the accompanying drawings.

Referring to the six figures of the drawings:—

Figure 1 is a plan view of the improved tool, with no parts shown below the line 1—1 of Fig. 2.

Fig. 2 is a side elevation of the tool, and also shows an axle-clip on which the tool is being used.

Fig. 3 is a view similar to Fig. 1, but with the die members omitted.

Fig. 4 is an inverted plan view of one of the die members.

Fig. 5 is a sectional view taken on the line 1—1 of Fig. 2.

Fig. 6 is a view in the same direction as Fig. 2, showing a shank portion of the tool.

Like characters of reference designate like parts in all the figures.

The tool includes a shank 10, whose lower end 11 is adapted to be held in a bit-brace.

The upper end of this shank 10 is formed into a pivotal head 12, and pivotal lugs 13 of a pair of mating jaws 14 are pivoted flatly on the side faces 15 of said head by a pin 16.

A tapered hand-nut 17 is screwthreaded to the central portion of the shank 10, and screwing this hand-nut upward the lower ends 18 of the jaws 14 are forced outward, thereby forcing the upper ends 19 of said jaws together.

The upper ends 19 of the jaws 14 are formed into heads 20 adapted to support the separable members 21 of the die, and the upper or die-supporting faces 22 of said heads are arranged to swing into the same plane and stand at right angles to the axis-line of the shank 10 when the jaws are closed.

The die members 21 are circular in this instance, and each is pivoted to its supporting jaw 14 by a screw 23 which is screw-threaded into its respective head 20.

The tool thus described is not materially different from those in use at this time.

In carrying out the objects of the invention, a small rod 24 of spring steel or other resilient material is rigidly fixed to the pivotal portion of each jaw 14, and the upper or free end 25 of this rod passes up slidably through the edge of the head 20 of the other jaw.

This rod 24 is not fixed directly to the exact pivotal point 26 of its jaw 14, but is firmly set in a protuberance 27 which is located integrally on said jaw above said pivotal point 26 and off-set in a lateral direction therefrom opposite the other jaw.

With the parts arranged in this way, a closing movement of the jaws 14 slides the upper end of the rod 24 of each jaw upward through the head of the other jaw and into one of a series of locking-holes 28 in the lower face of the die member carried by said other jaw; thus locking said die member against movement before the jaws have swung to closed or working position.

An opening movement of the jaws will, of course, withdraw the rods 24 and unlock the die members so that they be revolved on their supporting faces 22 and bring other cutting recesses 29 thereof in alinement for work; and, as a matter of convenience, the rods 24 should be long enough not to unlock the die members until the jaws are opened nearly to their limit.

The resiliency of the rods 24 may be utilized to swing the jaws 14 open when the hand-nut 17 is unscrewed.

Having thus described the invention, I claim:—

1. In a tool of the class described, a pair of jaws pivoted together, die members carried by the jaws and pivoted thereto, a rod carried by each jaw and extending into the die-supporting portion of the other jaw, said rod being adapted to form a locking pin for the die member of said other jaw and being movable to locking position by the closing movement of the jaws.

2. In a tool of the class described, a pair of jaws pivoted together, die members carried by the jaws and pivoted thereto, a resilient rod carried by each jaw and extending into the die-supporting portion of the other jaw, said rod being adapted to act as a spring to crowd the jaws apart and being also adapted to form a locking pin for the die member of said other jaw, the rod being movable to locking position by the closing movements of the jaws.

Witness my hand this 16 day of February, 1917.

JOHN W. LANE.

Copies of this patent may be obtained for five cents each, by addressing the "Commissioner of Patents, Washington, D. C."